2 Sheets—Sheet 1.
W. CRICH.
SPRING-BED BOTTOM.
No. 172,300. Patented Jan. 18, 1876.
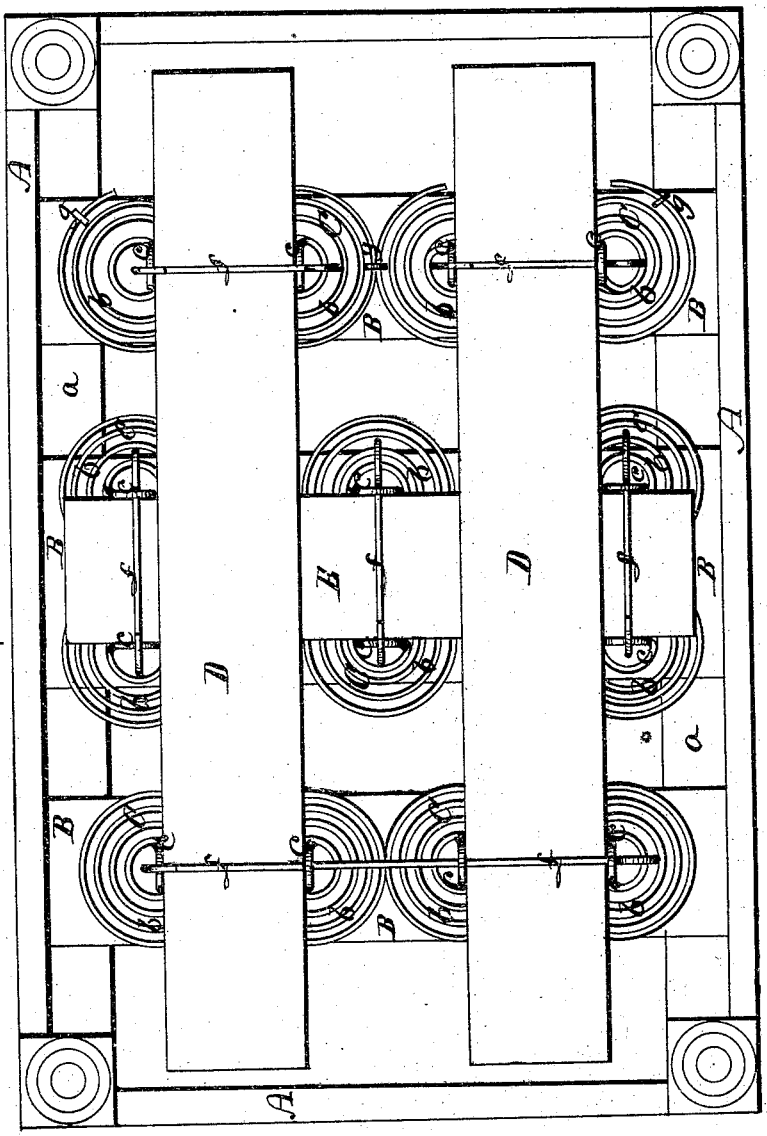
WITNESSES
INVENTOR,
William Crich,
By J. A. Brown,
his Attorney

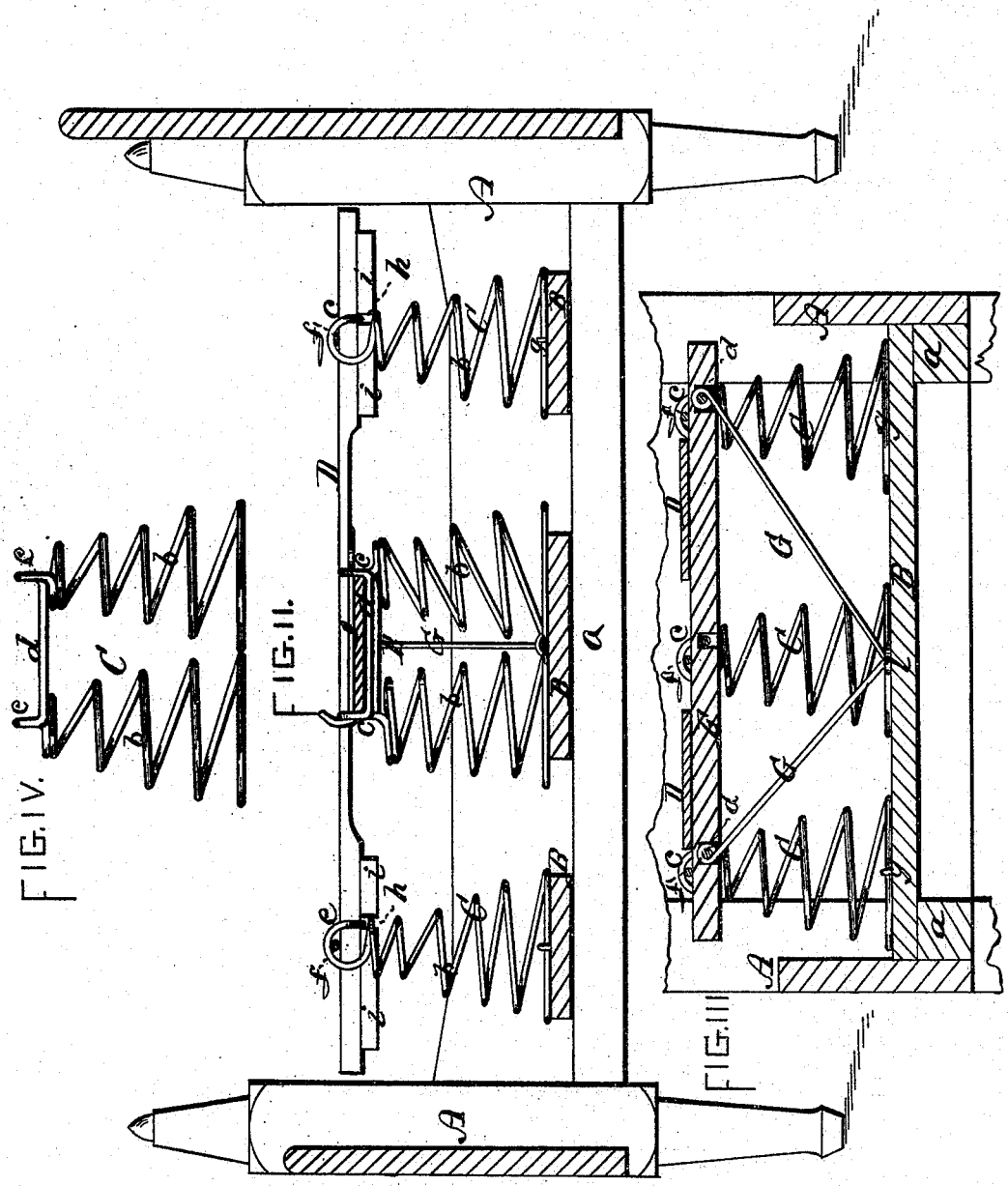

R. DALLEY.
APPARATUS FOR STEAMING FOOD FOR STOCK.
No. 172,301. Patented Jan. 18, 1876.
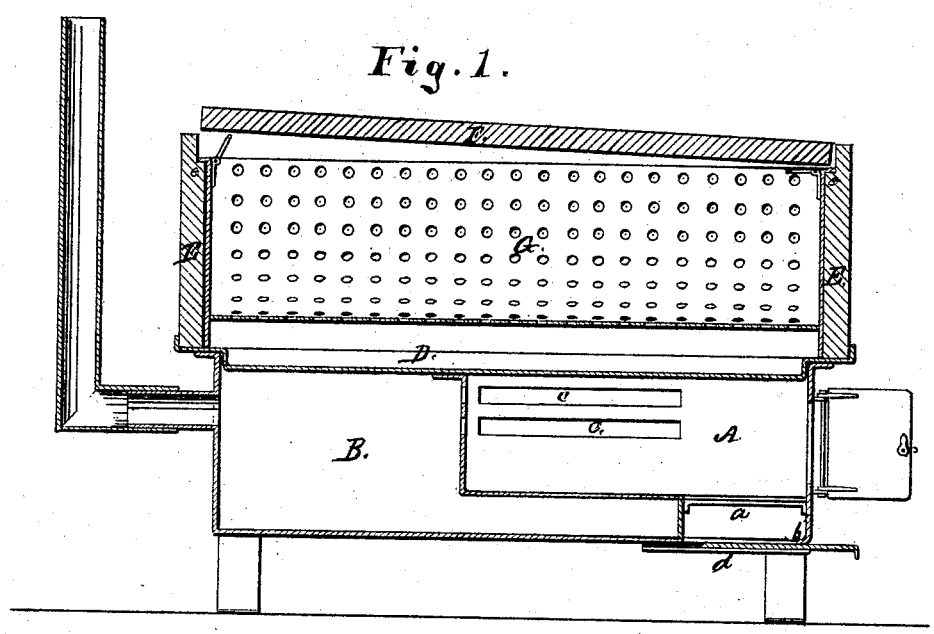
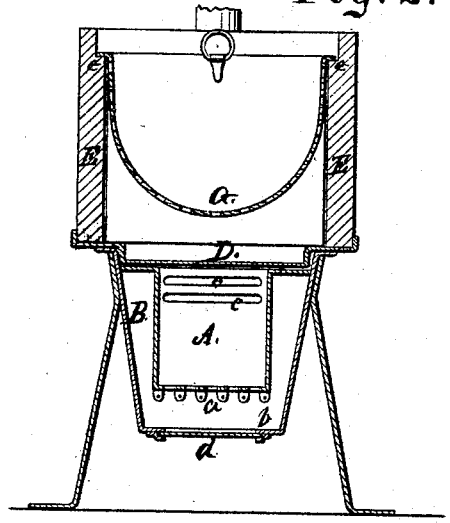
Witnesses
J. B. Woodruff
Arthur Libby
Inventor
Romain Dalley.